United States Patent [19]

Stubits

[11] 3,794,743

[45] Feb. 26, 1974

[54] METHOD OF REMOVING MELTED FATS FROM THE SURFACE OF AN EDIBLE AQUEOUS SOLUTION

[75] Inventor: Marcella C. Stubits, St. Louis, Mo.

[73] Assignee: Anheuser-Busch, Incorporated, St. Louis, Mo.

[22] Filed: Jan. 24, 1972

[21] Appl. No.: 220,392

[52] U.S. Cl. .............................. 426/417, 426/478
[51] Int. Cl. ............................................ A22c 18/00
[58] Field of Search ................. 99/107, 110; 210/40

[56] References Cited
UNITED STATES PATENTS

| | | | |
|---|---|---|---|
| 3,368,907 | 2/1968 | Miller | 99/107 X |
| 3,518,183 | 6/1970 | Evans | 210/40 |
| 3,689,406 | 9/1972 | Ohta | 210/40 |
| 3,692,538 | 9/1972 | Moss et al. | 99/107 |

Primary Examiner—Hyman Lord
Attorney, Agent, or Firm—William G. Bruns et al.

[57] ABSTRACT

This disclosure covers a method of removing a preselected portion of the fat or oil from the surface of a vessel of aqueous fluid. An edible carbohydrate fatty acid ester in powdered form (preferably cellulose laurate) is added to the fat and absorbs several times its own weight in fat. The fat laden cellulose laurate is removed from the fluid in the vessel, and, if the fat is extracted from the cellulose laurate; it can be reused.

3 Claims, No Drawings

METHOD OF REMOVING MELTED FATS FROM THE SURFACE OF AN EDIBLE AQUEOUS SOLUTION

REFERENCE TO OTHER APPLICATIONS

This application contains subject matter in common with applications filed of even date herewith as follows: Application of Stubits entitled DRY CLEANING METHOD Ser. No. 220,451; application of Teng et al entitled LIPOPHILIC CELLULOSE SPONGES Ser. No. 220,393; application of Teng et al entitled METHOD OF REMOVING OIL SPILLS Ser. No. 220,385; and previously filed pending applications of Teng et al Ser. No. 845,067, filed July 25, 1969 (now abandoned); Ser. No. 154,219, filed June 17, 1971 issued on May 1, 1973 as U.S. Pat. No. 3,730,693; Ser. No. 106,882, filed Jan. 15, 1971 issued on May 8, 1973 as U.S. Pat. No. 3,732,205; and Ser. No. 44,640, filed June 8, 1970 (now abandoned).

BACKGROUND OF THE INVENTION

Carbohydrate fatty acid ester compounds are water insoluble, and will absorb many times their weight in oil or fats. These properties allow their use as a fat or oil scavenger in an aqueous medium.

It is common practice for the housewife to remove the excess fat from soup, beef stock, gravy, etc.

This can be easily accomplished by allowing the mixture to cool, and lifting off the layer of congealed fat. However, this technique has two distinct disadvantages:

1. Cooling is time consuming.
2. Cooling and reheating is detrimental to flavor.

Therefore, the melted fat is usually skimmed off the top of the hot mixture with a paper towel or other absorbent material. This procedure is messy and not very effective. (Ice cubes are often floated on the hot mixture in an attempt to congeal to thin layer of fat so that it may be lifted off. This is also a difficult procedure).

This invention concerns the sprinkling of lipophilic cellulose or starch fatty acid esters in powder form on the surface of an edible hot mixture of fat and water. The carbohydrate fatty acid ester effectively congeals the melted fat, which is then easily removed with a spoon. No haste is required, as with melting ice cubes.

Carbohydrate fatty acid ester is a much better absorbent than a paper towel, and easier to handle.

The product of this invention has a consistency similar to fine corn meal. It can be packaged in a shaker box, and placed on the supermarket shelf with condiments at low cost to the consumer.

This product can be sold in bulk to restaurants, cafeterias, and hospital diet kitchens. If used regularly, it is helpful in removing cholesterol from the diet.

SUMMARY OF THE INVENTION

This invention comprises a method of removing fat from the surface of hot foods by applying particulate cellulose or starch fatty acid esters to the surface of the hot fluid to coagulate the fat and partially absorb the same so that the fat can be removed with the carbohydrate fatty acid ester.

DETAILED DESCRIPTION

The carbohydrate may be either starch or cellulose. The fatty acid component may be laurate, stearate, palmitate, oleate, and other similar long chain fatty acids of chain length $C_8$ to $C_{18}$. The fatty acid can be saturated or unsaturated.

The degree of substitution may vary from 1.5 to 3.0. The degree of substitution is based on a theoretical of three and measures the substitution of the theoretically available hydroxyl functions per monosaccharide unit with lipophilic groups. The degree of substitution determines the fat absorbing capacity of the carbohydrate fatty acid ester. Above a certain level, the more highly substituted the less is the fat absorbing capacity of the carbohydrate fatty acid ester.

Prior applications Ser. Nos. 845,067; 106,882; and 154,219 show methods of preparing carbohydrate fatty acid esters useful in this invention. These disclosures are incorporated herein and made a part of this application.

The carbohydrate fatty acid esters have a particle size of about eight to about 100 mesh and a specific gravity of about 1.0 to about 1.5. The esters can be granules, flakes or in wafer form.

The granules absorb about two to about ten times their own weight in fat in a period of one to two minutes. Approximately 0.15 to about 0.20 parts by weight carbohydrate fatty acid ester is added for each part fat desired to be removed. The temperature of the fluid into which the particles are sprinkled is about 80° to 100°C. The particles are left on the fluid surface for one to five minutes to absorb fat. About 50 to about 98 percent of the fat can be removed using normal procedures.

Following are detailed examples of this invention.

EXAMPLE NO. I

PREPARATION OF VEGETABLE BEEF SOUP

One lb. of beef ribs are boiled in two quarts of water for 1½ hours. One teaspoon of cellulose laurate (degree of substitution 1.6) (approximately two grams), is sprinkled on the surface of the hot mixture; the melted fat coagulates in two minutes into a solid cohesive mass which was easily removed with a spoon. The amount of fat removed is 15 grams. 100 grams of vegetables are added to the defatted beef stock and cooked until tender. This results in a vegetable beef soup of low fat content.

Cellulose laurate will absorb five to 10 times its weight in fat so the amount added may be adjusted to remove all or only part of the fat present.

EXAMPLE NO. II

PREPARATION OF CHICKEN NOODLE SOUP

One fat stewing hen of 5 lbs. is cut into pieces and cooked until tender in three quarts of boiling salted water. The chicken is removed and one tablespoon of cellulose laurate (degree of substitution 2.6) is sprinkled on the surface of the hot broth. The melted fat immediately solidifies into a solid mass, and is lifted out with a spoon. A thin layer of fat remains with and is enough to add a desirable flavor to the soup, without excess greasiness. The amount of cellulose laurate added is five grams and 35 grams of fat is removed. Eight ounces of noodles are added to the defatted chicken broth and cooked until tender to make a low fat chicken noodle soup.

The amount of cellulose laurate added may be adjusted to remove all or any part of the fat present.

EXAMPLE NO. III

PREPARATION OF LAMB STEW

One lb. of cubed lamb is cooked until tender in two quarts of boiling water. Excess fat is removed from the hot mixture by the addition of one teaspoon (two grams) of starch laurate (degree of substitution 2.8) which congeals the melted fat into a solid mass. The solidified fat is lifted out with a spoon. 10 grams of fat are removed. Enough fat remains to enhance the flavor of the stew. Vegtables are added and cooked until tender and the stew is thickened to the desired consistency with cornstarch for serving.

All or any fraction of the fat may be removed by variation in the amount of starch laurate added.

EXAMPLE NO. IV

BOILED BEEF RIBS

Beef ribs are boiled in water for one hour; the mixture cooled, and the solidified fat separates from the aqueous layer.

Five 1 gram samples of the recovered fat are weighed into 100 ml. beakers, and 40 ml. water is added. The mixtures are heated to boiling, and cellulose laurate is slowly added until the melted fat coagulates into a solid cohesive mass.

The following table tabulates the amount of cellulose laurate required for coagulation.

| Degree of Substitution OF CELLULOSE LAURATE | GRAMS OF CELLULOSE LAURATE USED PER GRAM FAT |
|---|---|
| 1.92 | 0.16 |
| 2.37 | 0.14 |
| 2.54 | 0.16 |
| 2.70 | 0.15 |
| 2.83 | 0.21 |

What is claimed is:

1. A method of removing melted fat from the surface of a heated edible aqueous solution containing a meat product which had been cooked therein in a cooking vessel, said edible aqueous solution having a temperature of about 80°C.–100°C., comprising the steps of
   a. adding a preselected amount of a lipophilic carbohydrate fatty acid ester in particulate form to the said surface, said lipophilic carbohydrate fatty acid ester having a chain length of about $C_8$ to about $C_{18}$ and a degree of substitution of about 1.5 to 3.0.
   b. maintaining the lipophilic carbohydrate fatty acid ester in contact with the melted fat on the surface of the edible aqueous solution containing the cooked meat product for a time sufficient to absorb at least a portion of the melted fat from said surface, and
   c. removing the lipophilic carbohydrate fatty acid ester and absorbed fat from said surface.

2. The method of claim 1 wherein about 0.15 to about 0.20 parts carbohydrate fatty acid ester is added per part fat removed.

3. The method of claim 1 wherein the lypophilic carbohydrate fatty acid ester is of about eight to about 100 mesh particle size and has a specific gravity of 1.0 to 1.5.

* * * * *